July 30, 1957 H. U. HJERMSTAD ET AL 2,801,349

VOLTAGE STABILIZING AND CONTROL APPARATUS

Filed Aug. 12, 1954

INVENTORS.
Hans U. Hjermstad &
Frank C. Elias:
By
Thiess, Olson, Mecklenburger,
von Holst, & Coltman.
Attys.

United States Patent Office 2,801,349

Patented July 30, 1957

2,801,349

VOLTAGE STABILIZING AND CONTROL APPARATUS

Hans U. Hjermstad, Chicago, and Frank C. Elias, Wheaton, Ill., assignors to Sola Electric Co., Chicago, Ill., a corporation of Delaware Application August 12, 1954, Serial No. 449,486

4 Claims. (Cl. 307—112)

This invention relates to voltage stabilizing and control apparatus to be connected between a utilization device and a current source of predetermined nominal voltage and frequency so as to be energized or deenergized at the same time that the operating switch of the utilization device is closed or opened, respectively, and it is an object of the invention to provide improved apparatus of this character.

The invention will be described partly in connection with television receivers and it is of particular advantage in connection therewith, but it will be understood that this is by way of example and the invention has equal application to any load or utilization device in which the same problems exist.

Television receivers are sensitive to variations in the applied or input voltage, the size of the picture varying substantially in proportion to changes therein. Such variations in picture size are quite objectionable, and it is an object of the invention to provide apparatus for eliminating them.

In new installations in metropolitan centers, the available voltage may be sufficiently well controlled so as to be substantially free of such fluctuations as would cause objectionable variations in the size of a television receiver picture. However, even in metropolitan centers, local circuits such as, for example, those in individual dwellings may become overloaded, causing relatively large fluctuations in voltage to occur, when additional appliances are connected to the local circuits, with consequent objectionable variations in the size of the television picture. In rural areas, the available supply voltage is subject to frequent fluctuations with a consequent aggravated situation of the character indicated. Accordingly, it is evident that some form of voltage stabilizing apparatus is desirable for a relatively large number of television installations.

The manufacturer of the television receiver ordinarily does not provide such stabilizing apparatus as a part of the internal structure of the television set, in view of the cost of such stabilizing apparatus and the fact that it is not needed in all situations. Thus, it is necessary to provide the stabilizing apparatus as a separate piece of equipment to be connected between the television receiver or other utilization device and the current source, that is, the voltage supply.

For the most convenient use of such stabilizing apparatus, in conjunction with a television receiver, for example, it is desirable that it be simply connected between the current source and the television set without requiring any modification of the internal circuits of the latter and that no manual operation be required for turning the television set on and off other than the manipulation of the power supply switch normally incorporated therein, customarily in conjunction with a volume control. If the stabilizing device were energized at all times when it is plugged into the local receptacle, however, a substantial power loss would result while the television set is not in operation. Accordingly, it is important that some form of control be associated with the stabilizing apparatus so that it is unenergized except when the television set is in operation.

It is a further object of the invention to provide apparatus of the character indicated which is simple in form, has a minimum number of moving parts, is economical to manufacture and is efficient in operation.

Still further objects and advantages of the invention will become apparent as the description proceeds.

For a better understanding of the invention, reference should be had to the accompanying drawing in which.

Figure 1:
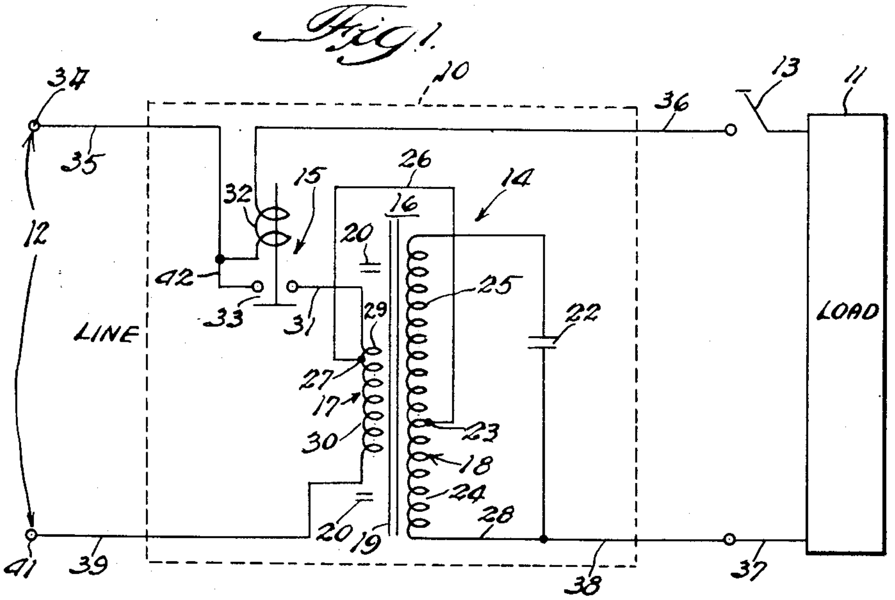
Figure 1 is a circuit diagram of apparatus embodying the invention.

Referring to the drawing, the invention is shown as comprising a voltage stabilizing and control apparatus 10 connected between a load 11 which, for example, may be a television receiver, and the line or current supply 12, a switch 13 being provided for connecting the apparatus 10 to the load 11. Ordinarily, the switch 13 is an integral part of the load 11, as is the case with television receivers.

The voltage stabilizing and control apparatus 10 comprises a resonant transformer and condenser combination 14 and a relay 15, connected as shown.

The transformer 16 of the resonant transformer and condenser combination 14 is of the high leakage reactance type and is shown as comprising a primary winding 17 and a secondary winding 18 mounted on a common core 19. The high leakage reactance associated with windings 17 and 18 is provided by high reluctance magnetic shunts 20 including air gaps 21 magnetically disposed between the windings 17 and 18. Connected across the secondary winding 18 is a condenser 22, which has a capacitive reactance at the frequency of the source 12, relative to the inductive reactance of the secondary winding 18 at the same frequency and over a rated range of supply voltage variation at source 12, such as to create in the circuit comprising a secondary winding 18 and the condenser 22 a condition in the nature of series resonance when the primary winding 17 is excited at rated voltage and frequency. While this condition may be obtained with many combinations of size of the condenser 22 and the number of turns of winding 18, in combination with other factors of the transformer, it has been found economical to utilize condensers having a nominal voltage rating of approximately 600 to 700 volts. This voltage originally being too high for use with television receivers or other small appliances, the winding 18 is tapped at an intermediate point 23, thereby dividing the secondary winding 18 into two parts 24 and 25 of which part 24 serves as a load or output winding. Connected to tap 23 is a conductor 26 which is connected to a tap 27 on the primary winding 17, dividing the latter into two parts 29 and 30 for a purpose to be described subsequently in this specification.

The resonant transformer and condenser combination, wherein the condenser is connected in circuit with the secondary winding of the transformer, serves to establish a total flux in the secondary portion of the transformer core greater than that in the primary portion of the core by an amount sufficient to cause a saturation effect in the secondary portion of the core for maintaining the secondary voltage substantially constant over a wide range of primary voltages (stabilized voltage) and is of the form disclosed an claimed in the Joseph G. Sola Patent No. 2,143,745, dated January 10, 1939.

Figure 2:
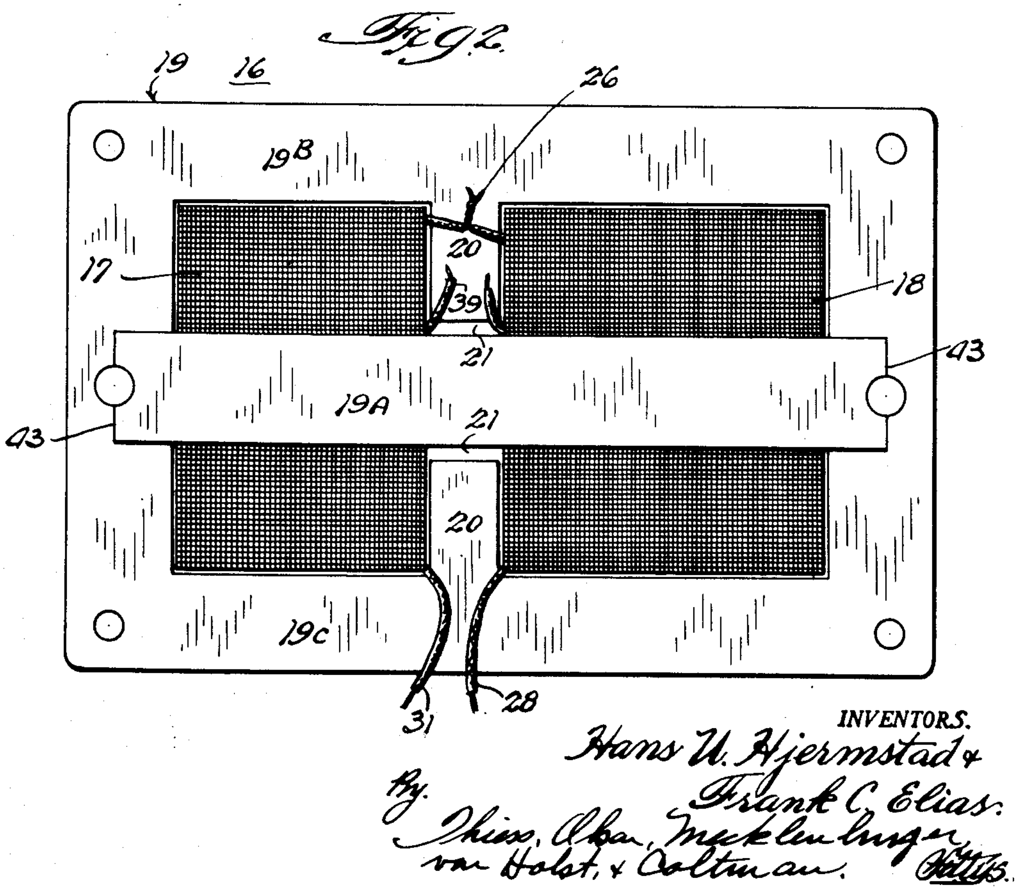
Fig. 2 is a plan view partially in section of one form of transformer which may be used in carrying out the invention and which is shown schematically in Fig. 1.

The transformer shown in Fig. 2 is exemplary of one practical form of structure actually built for resonant operation in connection with a television receiver and having a full load rating of 300 volt-amperes. In this construction, the core 19 consists of continuous outer laminations and central laminations punched from 24-gauge transformer steel, the cross-sectional area of the central leg 19A being approximately 2.19 square inches and the combined cross-sectional areas of the outer legs 19B and 19C being approximately 3.75 square inches. The air gaps 21 are approximately .128 inch in length. The primary winding 17 intended for connection to a 60-cycle supply circuit of approximately 118 volts has 250 turns of #15 enameled copper wire with the tap 27 being placed so that winding portion 30 has 200 turns and winding portion 29 has 50 turns. The secondary winding 18 has a total of 846 turns, the winding portion 25 having 648 turns of #18 enameled copper wire and the winding portion 24 having 198 turns of #17 enameled copper wire.

The total cross-sectional area of the combined outer legs 19B and 19C is substantially greater than that of the central leg 19A, whereby substantially no stray fields exist around the core even though the condition in the nature of series resonance exists with consequent high flux density. Accordingly, interference with the television picture due to stray magnetic coupling is prevented.

The ends of the central leg 19A are received within rectangularly shaped slots in the end legs of the core to give metal-to-metal contact along the sides of the end portions of the central leg 19A. With this construction a small gap may actually exist along the lines 43 forming the junction between the very ends of the central leg 19A and the proximate surfaces of the end legs of the outer shell so that any tendency to bowing of the central leg 19A is eliminated. Certain humming noises are thereby prevented. A core of the form shown in Fig. 2 is illustrated and certain aspects thereof are claimed in the Joseph G. Sola Patent No. 2,582,291, dated January 15, 1952.

The condenser 22 in the practical structure referred to has a capacity of 6 mfds. at 660 volts.

Whatever portion of the full voltage of secondary winding 18 is desired for supplying the particular load, may be obtained by appropriately positioning the tap 23. Thus, the voltage of the winding portion 24 between the tap 23 and conductor 28 may be approximately the voltage desired. This voltage is substantially constant with the apparatus operating in a condition substantially in the nature of series resonance, but slight fluctuations may occur with fluctuations in the voltage of source 12. These fluctuations may be compensated for by appropriately locating the tap 27, thereby placing a suitable portion 29 of the primary winding in the output circuit of the transformer. In this event, it is necessary that the turns 29 of the primary winding provide a voltage which is in opposition to the voltage of the secondary winding portion 24. The portion 29 of the primary winding terminates in a conductor 31 and the output voltage of the stabilizing apparatus appears across conductors 28 and 31 and may be applied to the load through a circuit to be described subsequently in this specification.

The relay 15 includes a coil 32 and a pair of normally open contacts 33 which are disposed in the primary circuit of the transformer as well as in the load or output circuit thereof. When these contacts are open, that is, when coil 32 is unenergized, the transformer and condenser combination 14 is unenergized. The relay 15 is unenergized when the switch 13 is open and becomes energized when switch 13 is closed. Thus, the transformer and condenser combination 14 also is energized only when switch 13 is closed and is unenergized when switch 13 is open.

The pickup circuit of relay 15 may now be traced as follows: From terminal 34 of the source 12 through conductor 35, relay coil 32, conductor 36, switch 13, load 11, conductors 37, 38 and 28, secondary winding portion 24, tap 23, conductor 26, tap 27, primary winding portion 30 and conductor 39 to terminal 41 of the source 12.

When switch 13 is closed, the circuit described is completed and current flows in coil 32. By virtue of this current, the contacts 33 are closed thereby providing a circuit for energization of the primary winding 17 which may be traced as follows: From terminal 34 through conductors 35 and 42, closed contacts 33, conductor 31, portions 29 and 30 of the primary winding and conductor 39 to terminal 41 of the source.

Because of the energization of the primary winding 17, the transformer assumes its condition in the nature of series resonance and the uncompensated but substantially stabilized output voltage appears across tap 23 and conductor 28. The output voltage of winding portion 24 is then compensated and applied to the load through the normally closed contacts 33 and the circuit which may be traced as follows: From tap 23, forming one terminal of winding portion 24, through conductor 26, portion 29 of the primary winding, conductor 31, closed contacts 33, conductor 42, coil 32, conductor 36, closed switch 13, load 11 and conductors 37, 38 and 28 to the other terminal of secondary winding portion 24. Current accordingly flows in the circuit outlined through the load for energizing it and also flows through the relay coil 32, thereby maintaining this coil energized and the contacts 33 closed.

Immediately upon opening switch 13, the circuit just described is interrupted and the current through coil 32 is interrupted, whereupon contacts 33 open and the transformer and condenser combination 14, as well as the load 11, become deenergized.

The current flowing through the pickup circuit of the relay 15 is determined largely by the impedance of the load 11 and the series impedance of the secondary winding portion 24 and the primary winding portion 30 of the transformer 16. Since this current may differ in magnitude from the current which flows through the load and the relay coil 32 after the contacts 33 are closed, that is, in the operating condition of the device, the relay 15 must be such that it will pick up on the current flowing in the pickup circuit and will hold in with the current flowing during operation. The primary winding portion 30 and the secondary winding portion 24 being in series in the pickup circuit, the net impedance of these two winding portions may be high or low depending upon the relative polarity of the primary and secondary windings 17 and 18, respectively. In a preferred form of the invention, the relative polarity of primary and secondary windings is additive, that is, both windings cause flux to flow in the same direction through the core when winding portions 30 and 24 are in series circuit and thus the series impedance of these winding portions is high. However, because of the presence of the condenser 22 which effects the condition in the nature of series resonance, the net impedance is sufficiently low so that ample current flows through the relay coil 32 to close the contacts 33. Also, in the preferred form referred to, the polarity of windings 17 and 18 is as indicated in order that the voltage of the winding portion 29 may buck the voltage of the secondary winding portion 24.

In the event that no compensating winding 29 is needed, or in the event that compensation is obtained by a coupled winding, the relative polarity of the primary and secondary windings may be either additive or subtractive, provided that appropriate adjustments in the transformer constants are made. If the portion 29 of the primry winding is intended to provide a boosting voltage, rather than a bucking voltage, the relative polarity of the primary and secondary windings may be reversed whereby the winding portions 30 and 24 provide a low impedance in the initial or pickup circuit.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Voltage stabilizing and control apparatus to be connected between a utilization device and a current source of predetermined nominal voltage and frequency and to be energized or deenergized as a consequence of closing or opening the operating switch of such device comprising a transformer having a core and primary and secondary windings disposed thereon, a magnetic shunt magnetically disposed between said windings thereby to provide said windings with high inductive reactance, a condenser connected across substantially said secondary winding, said condenser having a value of capacitive reactance at the frequency of said source relative to the value of the inductive reactance of said secondary winding at said frequency whereby a condition in the nature of series resonance exists in the circuit of said condenser and said secondary winding when said primary winding is connected to said current source, at least a portion of said secondary winding constituting a load winding, a connection from said load winding to said primary winding, secondary conductors for connecting said load winding to said utilization device, primary conductors for connecting said primary winding to said current source, and a relay including a coil and a pair of normally open contacts to be actuated thereby, said coil being connected in series between one of said primary conductors and one of said secondary conductors to complete a series operation-initiating circuit for said relay from said current source through substantially said primary winding, said load winding, and said utilization device and the operating switch thereof when said switch is closed, said contacts when closed in response to completion of said operation-initiating circuit connecting said primary winding directly across said current source through said primary conductors and completing an energizing circuit for said utilization device across said load winding including said coil in series therewith whereby said load winding serves to energize said utilization device and to maintain energization of said coil as long as said operating switch remains closed and said primary conductors remain energized from said current source.

2. Voltage stabilizing and control apparatus to be connected between a utilization device and a current source of predetermined nominal voltage and frequency and to be energized or deenergized as a consequence of closing or opening the operating switch of such device comprising a transformer having a core and primary and secondary windings disposed thereon, a magnetic shunt magnetically disposed between said windings thereby to provide said windings with high inductive reactance, a condenser connected across substantially said secondary winding, said condenser having a value of capacitive reactance at the frequency of said source relative to the value of the inductive reactance of said secondary winding at said frequency whereby a condition in the nature of series resonance exists in the circuit of said condenser and said secondary winding when said primary winding is connected to said current source, at least a portion of said secondary winding constituting a load winding, a connection extending from said load winding to said primary winding so as to provide a portion thereof as a compensating winding, secondary conductors for connecting said load winding and said compensating winding to said utilization device, primary conductors for connecting said primary winding to said current source, and a relay including a coil and a pair of normally open contacts to be actuated thereby, said coil being connected in series between one of said primary conductors and one of said secondary conductors to complete a series operation-initiating circuit for said relay from said current source through the noncompensating portion of said primary winding, said load winding, and said utilization device and the operating switch thereof when said switch is closed, said contacts when closed in response to completion of said operation-initiating circuit connecting said primary winding directly across said current source through said primary conductors and completing an energizing circuit for said utilization device across said load winding including said coil in series therewith whereby said load winding serves to energize said utilization device and to maintain energization of said coil as long as said operating switch remains closed and said primary conductors remain energized from said current source.

3. Voltage stabilizing and control apparatus to be connected between a utilization device and a current source of predetermined nominal voltage and frequency and to be energized or deenergized as a consequence of closing or opening the operating switch of such device comprising a transformer having a core and primary and secondary windings disposed thereon, a magnetic shunt magnetically disposed between said windings thereby to provide said windings with high inductive reactance, a condenser connected across substantially said secondary winding, said condenser having a value of capacitive reactance at the frequency of said source relative to the value of the inductive reactance of said secondary winding at said frequency whereby a condition in the nature of series resonance exists in the circuit of said condenser and said secondary winding when said primary winding is connected to said current source, at least a portion of said secondary winding constituting a load winding, a connection extending from said load winding to said primary winding so as to provide a portion thereof, a compensating winding, said secondary winding having a polarity relative to said primary winding so that the voltage of said compensating winding is in opposition to the voltage of said load winding, secondary conductors for connecting said at least a portion of said secondary winding and said compensating winding to said utilization device, primary conductors for connecting said primary winding to said current supply, and a relay including a coil and a pair of normally open contacts to be actuated thereby, said coil being connected in series between one of said primary conductors and one of said secondary conductors to complete a series operation-initiating circuit for said relay from said current source through the noncompensating portion of said primary winding, said load winding, and said utilization device and the operating switch thereof when said switch is closed, said contacts when closed in response to completion of said operation-initiating circuit connecting said primary winding directly across said current source through said primary conductors and completing an energizing circuit for said utilization device across said load winding including said coil in series therewith whereby said load winding serves to energize said utilization device and to maintain energization of said coil as long as said operating switch remains closed and said primary conductors remain energized from said current source.

4. Voltage stabilizing and control apparatus to be connected between a utilization device and a current source of predetermined nominal voltage and frequency and to be energized or deenergized as a consequence of closing or opening the operating switch of such device comprising a transformer having a core and primary and secondary windings disposed thereon, a magnetic shunt magnetically disposed between said windings thereby to provide said windings with high inductive reactance, a condenser connected across substantially said secondary winding, said condenser having a value of capacitive reactance at the frequency of said source relative to the value of the inductive reactance of said secondary winding at said frequency whereby a condition in the nature of series resonance exists in the circuit of said condenser and said secondary winding when said primary winding is connected to said current source, at least a portion of said secondary winding constituting a load winding, a compensating winding connection extending from said load winding to said primary winding, secondary conductors for connecting said load secondary winding to said utilization device, primary conductors for connecting said primary winding to said current source, and a relay including a coil and a pair of normally open contacts to be actuated thereby, said coil being connected in series between one of said primary conductors and one of said secondary conductors to complete a series operation-initiating circuit for said relay from said current source through substantially said primary winding, said load winding, and said utilization device and the operating switch thereof when said switch is closed, said contacts when closed in response to completion of said operation-initiating circuit connecting said primary winding directly across said current source through said primary conductors and completing an energizing circuit for said utilization device across said load winding including said coil in series therewith whereby said load winding serves to energize said utilization device and to maintain energization of said coil as long as said operating switch remains closed and said primary conductors remain energized from said current source.

References Cited in the file of this patent

UNITED STATES PATENTS

| | | |
|---|---|---|
| 1,007,480 | North et al. | Oct. 31, 1911 |
| 2,143,745 | Sola | Jan. 10, 1939 |